US010168522B2

(12) United States Patent
Fujii

(10) Patent No.: US 10,168,522 B2
(45) Date of Patent: *Jan. 1, 2019

(54) PATTERN IRRADIATION APPARATUS HAVING SPATIAL LIGHT MODULATOR AND LIGHT BLOCKING MEMBER FOR BLOCKING 0-ORDER LIGHT GENERATED BY SPATIAL LIGHT MODULATOR

(71) Applicant: OLYMPUS CORPORATION, Tokyo (JP)

(72) Inventor: Shintaro Fujii, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 158 days.

This patent is subject to a terminal disclaimer.

(21) Appl. No.: 15/295,648

(22) Filed: Oct. 17, 2016

(65) Prior Publication Data
US 2017/0031147 A1  Feb. 2, 2017

Related U.S. Application Data

(62) Division of application No. 14/228,030, filed on Mar. 27, 2014, now Pat. No. 9,500,848.

(30) Foreign Application Priority Data

Apr. 4, 2013 (JP) .................................. 2013-078120

(51) Int. Cl.
*G02B 26/06* (2006.01)
*G02B 21/08* (2006.01)
(Continued)

(52) U.S. Cl.
CPC ............. *G02B 21/08* (2013.01); *G02B 21/02* (2013.01); *G02B 21/14* (2013.01); *G02B 26/06* (2013.01); *G02B 27/46* (2013.01)

(58) Field of Classification Search
CPC ........ G02B 21/02; G02B 21/08; G02B 21/14; G02B 26/06; G02B 27/46; G01B 11/0691
(Continued)

(56) References Cited

U.S. PATENT DOCUMENTS 8,004,658 B2 * 8/2011 Shigematsu ........... G02B 5/001
                                                            355/67
2006/0043184 A1 3/2006 Fukuchi et al.
(Continued)

FOREIGN PATENT DOCUMENTS

JP       08330223 A    12/1996
JP    2001272636 A    10/2001
(Continued)

OTHER PUBLICATIONS

Japanese Office Action (and English translation thereof) dated Jan. 24, 2017, issued in counterpart Japanese Application No. 2013-078120.

*Primary Examiner* — Que T Le
(74) *Attorney, Agent, or Firm* — Holtz, Holtz & Volek PC

(57) ABSTRACT

A pattern irradiation apparatus includes a light source unit, an objective that irradiates a sample plane with light emitted from the light source unit, a spatial light modulator of a phase modulation type that is arranged at a position conjugate with a pupil position of the objective and that modulates a phase of the light emitted from the light source unit, a light blocking member that is arranged in an optical path between the spatial light modulator and the objective and that is configured to block 0-order light generated by the spatial light modulator, and a control device that makes a correspondence between a focusing position of the 0-order light generated by the spatial light modulator and a position of the light blocking member.

8 Claims, 11 Drawing Sheets

(51) Int. Cl.
*G02B 21/14* (2006.01)
*G02B 27/46* (2006.01)
*G02B 21/02* (2006.01)

(58) Field of Classification Search
USPC .......................................... 250/559.22, 216
See application file for complete search history.

(56) References Cited

U.S. PATENT DOCUMENTS

| 2007/0114371 A1 | 5/2007 | Fukuchi et al. |
| 2010/0157422 A1 | 6/2010 | Ouchi et al. |
| 2011/0069136 A1 | 3/2011 | Hashimoto et al. |
| 2011/0109958 A1 | 5/2011 | Yokoi |
| 2014/0055594 A1 | 2/2014 | Nomura et al. |

FOREIGN PATENT DOCUMENTS

| JP | 2006072279 A | 3/2006 |
| JP | 2007114403 A | 5/2007 |
| JP | 2009150865 A | 7/2009 |
| JP | 2011099986 A | 5/2011 |
| WO | 2012153495 A1 | 11/2012 |

* cited by examiner

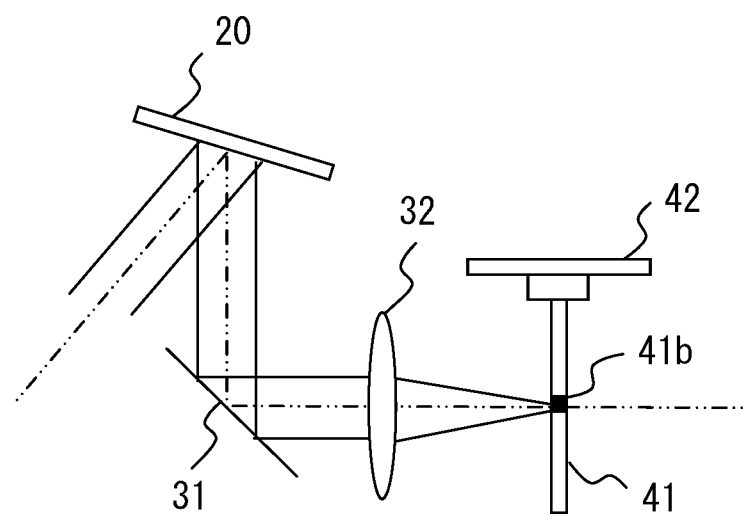
F I G. 4 A

PATTERN IRRADIATION APPARATUS HAVING SPATIAL LIGHT MODULATOR AND LIGHT BLOCKING MEMBER FOR BLOCKING 0-ORDER LIGHT GENERATED BY SPATIAL LIGHT MODULATOR

CROSS REFERENCE TO RELATED APPLICATIONS

This application is a Divisional application of U.S. Ser. No. 14/228,030, filed Mar. 27, 2014, which is based upon and claims the benefit of priority from prior Japanese Patent Application No. 2013-078120, filed Apr. 4, 2013, the entire contents of which are incorporated herein by this reference.

BACKGROUND OF THE INVENTION

Field of the Invention

The present invention is related to a pattern irradiation apparatus, and particularly to a pattern irradiation apparatus including a phase modulation spatial light modulator.

Description of the Related Art

Pattern irradiation apparatuses have conventionally been known that form an arbitrary pattern of light on a sample plane by using a spatial light modulator (SLM) of a phase modulation type, such as LCOS (Liquid Crystal on Silicon).

In a pattern irradiation apparatus using an SLM of a phase modulation type, an SLM arranged at position conjugate (referred to as an pupil conjugate position hereinafter) with a pupil of objective modulates the phase of light from the light source so as to form a pattern of light (referred to as an irradiation pattern hereinafter) having an arbitrary spatial intensity distribution on a sample plane by utilizing diffracted light generated by the SLM.

However, due to diffraction efficiency, incident light is not emitted in its entirety from an SLM as diffracted light and 0-order light that is not diffracted by the SLM is also emitted together with the diffracted light. This results in a situation where spot P2 is formed by the 0-order light that is focused on the optical axis on sample plane SP in addition to irradiation pattern P1 formed by the diffracted light as shown in FIG. 1A.

A device for example disclosed by Japanese Laid-open Patent Publication No. 2001-272636 includes a 0-order light shutoff plate for shutting off 0-order light on the optical axis immediately before a sample in order to eliminate the above influence of 0-order light. By arranging a 0-order light shutoff plate 1 in the vicinity of the focusing position of 0-order light so as to shut off 0-order light, it is possible to form only desired irradiation pattern P1 on sample plane SP as shown in FIG. 1B.

SUMMARY OF THE INVENTION

An aspect of the present invention provides a pattern irradiation apparatus including a light source unit, an objective that irradiates a sample plane with light emitted from the light source unit, a spatial light modulator of a phase modulation type that is arranged at a position conjugate with a pupil position of the objective and that modulates a phase of the light emitted from the light source unit, a light blocking member that is arranged in an optical path between the spatial light modulator and the objective and that is configured to block 0-order light generated by the spatial light modulator, and a control device that makes a correspondence between a focusing position of the 0-order light generated by the spatial light modulator and a position of the light blocking member.

BRIEF DESCRIPTION OF THE DRAWINGS

The present invention will be more apparent from the following detailed description when the accompanying drawings are referenced.

FIG. 4A is a first view explaining a method of blocking 0-order light by moving the 0-order light cut filter;

DESCRIPTION OF THE EMBODIMENTS

In an actual pattern irradiation apparatus, states of light incident on an SLM are changed by variability between individual light sources, switching between light source wavelengths, changes in the diameter of light fluxes, etc., and accompanying this, the focusing position of 0-order light also changes.

Figure 1A:
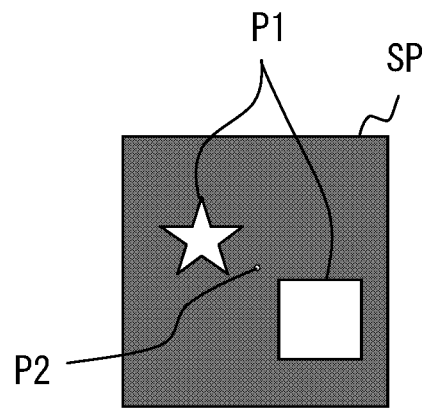
FIG. 1A shows an example in which an irradiation pattern by diffracted light and a spot by 0-order light are formed on a sample plane.
Figure 1B:
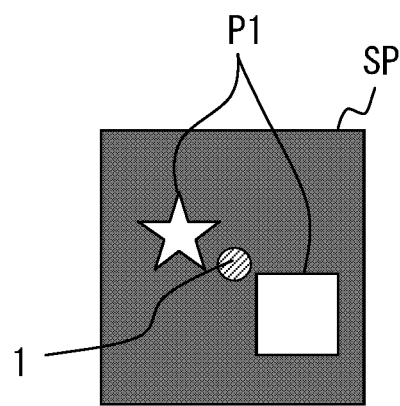
FIG. 1B shows an example of an irradiation pattern formed by diffracted light on a sample plane for which a 0-order light shutoff plate is arranged.
Figure 1C:
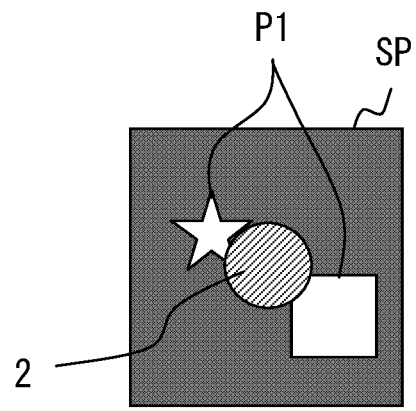
FIG. 1C shows an example of an irradiation pattern formed by diffracted light on a sample plane for which a 0-order light shutoff plate of a size different from that arranged in FIG. 1B is arranged.

Accordingly, even in a device disclosed by Japanese Laid-open Patent Publication No. 2001-272636, a situation can occur where part or the whole of 0-order light passes through a spot apart from the position of the 0-order light shutoff plate and a sample plane is irradiated with it. In order to avoid this situation, it may be possible to arrange a relatively large 0-order light shutoff plate 2 in the vicinity of a 0-order light-focusing position in consideration of changes in 0-order light-focusing positions. However, not only 0-order light but also diffracted light fails to pass through an area having the 0-order light shutoff plate 2, and accordingly this configuration narrows the area on a sample plane that permits the formation of a pattern. This, in some cases, leads to a situation where an irradiation pattern is partially shut by the 0-order light shutoff plate 2 as shown FIG. 1C.

Hereinbelow, respective embodiments of the present invention will be explained by referring to the drawings.

Embodiment 1

Figure 2:
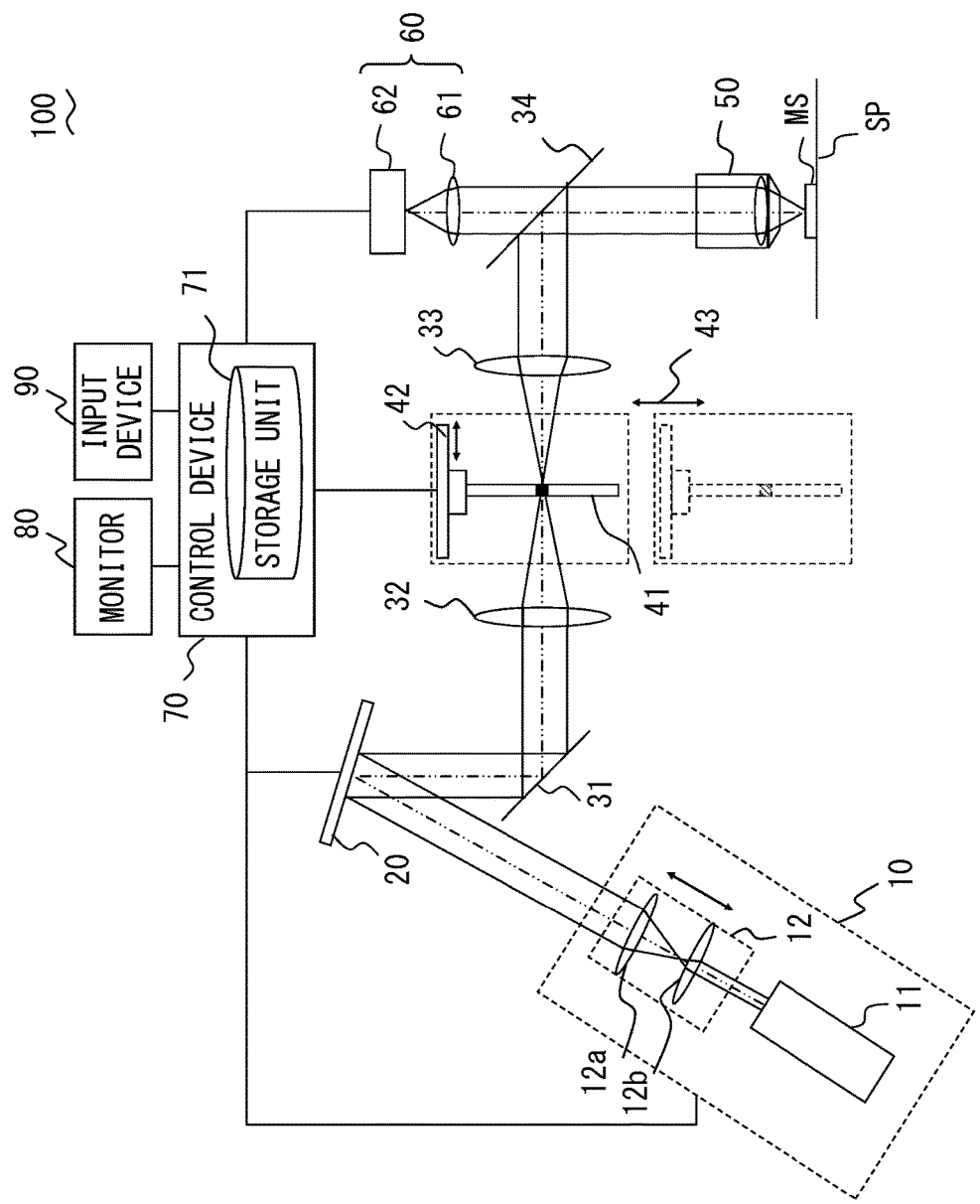
FIG. 2 shows an example of a configuration of a pattern irradiation apparatus according to an embodiment 1 of the present invention.

FIG. 2 shows an example of a configuration of a pattern irradiation apparatus according to a present embodiment. A pattern irradiation apparatus 100 shown in FIG. 2 is a pattern irradiation apparatus having a pattern irradiation function for irradiating sample plane SP with light of an arbitrary pattern and a blocking function for blocking 0-order light, which does not contribute to the formation of an irradiation pattern.

The pattern irradiation apparatus 100 includes a microscope, a control device 70 that controls the microscope, and a monitor 80 and an input device 90 that are connected to the control device 70. In other words, the pattern irradiation apparatus 100 is a microscope apparatus that has a microscope.

The microscope included in the pattern irradiation apparatus 100 includes a light source unit 10, an objective 50 that irradiates sample plane SP with light emitted from the light source unit 10, an SLM 20 of a phase modulation type that modulates the phase of light emitted from the light source unit 10, an optical system (a mirror 31, a Fourier transform lens 32, a lens 33, and a half mirror 34) for projecting the SLM 20 onto the pupil position of the objective 50, and an observation system 60 for observing sample plane SP.

The light source unit 10 includes a light source 11 that emits coherent light and a beam expander 12 that changes the flux diameter of light emitted from the light source unit 10 by changing the distance between lenses 12a and 12b. An example of the light source 11 is an infrared pulse laser that emits ultrashort pulse laser light in the infrared region.

The SLM 20 is arranged at a position optically conjugate with the pupil position of the objective 50. The SLM 20 includes a plurality of pixel elements that are controlled independently and that are arranged two dimensionally, and the phase of laser light incident on the SLM 20 is modulated by pixel elements on which light is incident. In the microscope, an arbitrary optical pattern of laser light is formed on sample plane SP by the SLM 20 modulating the phase of light emitted from the light source unit 10. Also, an example of the SLM 20 is LCOS, which is an SLM of a reflection type.

The optical system for projecting the SLM 20 onto the pupil position of the objective 50 includes the mirror 31, the Fourier transform lens 32 that focuses light reflected by the mirror 31 so as to form a primary image of the light source 11, the lens 33, and the half mirror 34 that reflects light whose phase has been modulated by the SLM 20 to the objective 50.

The observation system 60 includes a tube lens 61 that forms an image on a camera 62 by utilizing incident light arriving from sample plane SP after being transmitted through the half mirror 34, and the camera 62. The camera 62 includes an optical detector such as, for example, a CCD image sensor that detects light from sample plane SP, and generates an image of sample plane SP on the basis of a signal from the optical detector and transmits the image to the control device 70.

The microscope further includes a 0-order light cut filter 41, which is a light blocking member that blocks 0-order light generated by the SLM 20, a position adjustment mechanism 42 that changes the position of the 0-order light cut filter 41, and an insertion-removal mechanism 43 that inserts and removes the 0-order light cut filter 41 with respect to the optical path between the SLM 20 and the objective 50.

Figure 3:
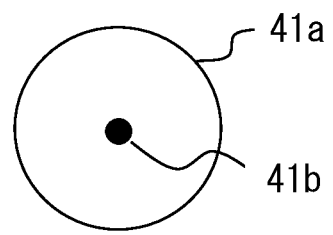
FIG. 3 shows an example of a configuration of a 0-order light cut filter included in the pattern irradiation apparatus shown in FIG. 2.

The 0-order light cut filter 41 is arranged in the optical path between the SLM 20 and the objective 50. The 0-order light cut filter 41 includes a transmitting area 41a that transmits light and a blocking area 41b that blocks light as shown in FIG. 3, and is produced by for example evaporating a metal mirror on the central portion of a glass substrate.

The position adjustment mechanism 42 is a mechanism that moves the 0-order light cut filter 41 in the optical axis directions, and is for example a rack-and-pinion mechanism. The position adjustment mechanism 42 may also be configured to move the 0-order light cut filter 41 in the directions orthogonal to the optical axis in addition to the optical axis directions.

The control device 70 includes a storage unit 71 having a hard disk, a memory, etc., and is connected to at least the light source unit 10, the SLM 20, the position adjustment mechanism 42, and the camera 62 among the constituents of the microscope. The control device 70 is configured to control these constituents and to receive and process signals from these constituents. The control device 70 is for example a personal computer or the like.

The storage unit 71 stores, beforehand, information for making a correspondence between the focusing position of 0-order light generated by the SLM 20 and the position of the blocking area 41b of the 0-order light cut filter 41 (referred to as correspondence control information hereinafter) for respective states between which at least one of the wavelength, the wavefront, and the light flux diameter of light emitted from the light source unit 10 is different (referred to as a state of the light source unit 10 hereinafter). A method of preparing correspondence control information in the storage unit 71 for each state of the light source unit 10 will be explained later.

In the pattern irradiation apparatus 100 having the above configuration, by the control device 70 controlling the light source unit 10, the flux diameter of light emitted from the light source 11 is controlled by the beam expander 12 so that it becomes a light flux diameter corresponding to the pupil diameter of the objective 50, and light having its flux diameter adjusted is incident on the SLM 20. Then, the control device 70 controls the phase modulation pattern of the SLM 20 so that it becomes a phase modulation pattern calculated from an irradiation pattern to be formed on sample plane SP, and thereby the phase of light incident on the SLM 20 is modulated and the Fourier transform of light from the SLM 20 is projected onto a focusing plane formed by the Fourier transform lens 32. Thereby, an irradiation pattern based on diffracted light is formed on the focusing plane. At the same time, a spot based on 0-order light is also formed on the focusing plane.

Further, the control device 70 reads correspondence control information corresponding to the state of the light source unit 10 stored in the storage unit 71, and performs control on the position adjustment mechanism 42 on the basis of the read correspondence control information so that the focusing position of 0-order light generated by the SLM 20 and the position of the blocking area 41b of the 0-order light cut filter 41 correspond to each other.

Figure 4B:
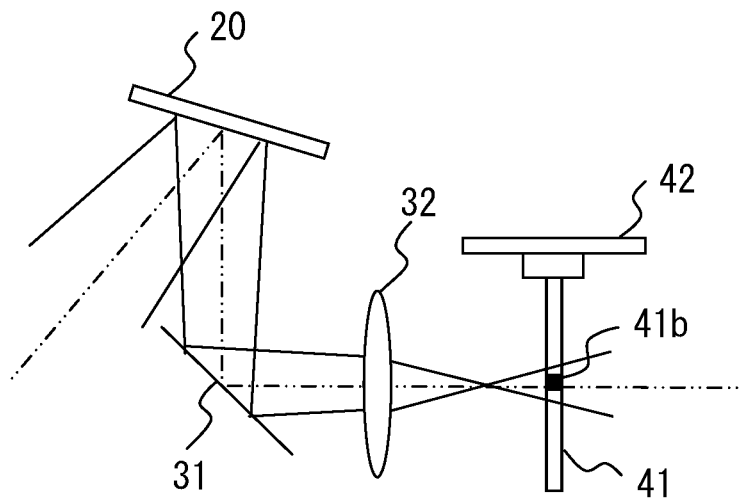
FIG. 4B is a second view explaining the method of blocking 0-order light by moving the 0-order light cut filter.

The reason for the control device 70 performing control on the basis of the correspondence control information corresponding to the state of the light source unit 10 is that an adjustment of the flux diameter of light emitted from the light source unit 10 on the basis of the pupil diameter of the objective 50 would also change the radius of curvature of the wavefront together with the flux diameter, sometimes moving the focusing position. In other words, it is because when a light flux diameter is changed, the focusing position after the changing of the light flux diameter is sometimes shifted from the position of the blocking area 41b as shown in FIG. 4B even when the focusing position before the changing of the light flux diameter corresponds to the position of the blocking area 41b as shown in FIG. 4A.

Figure 4C:
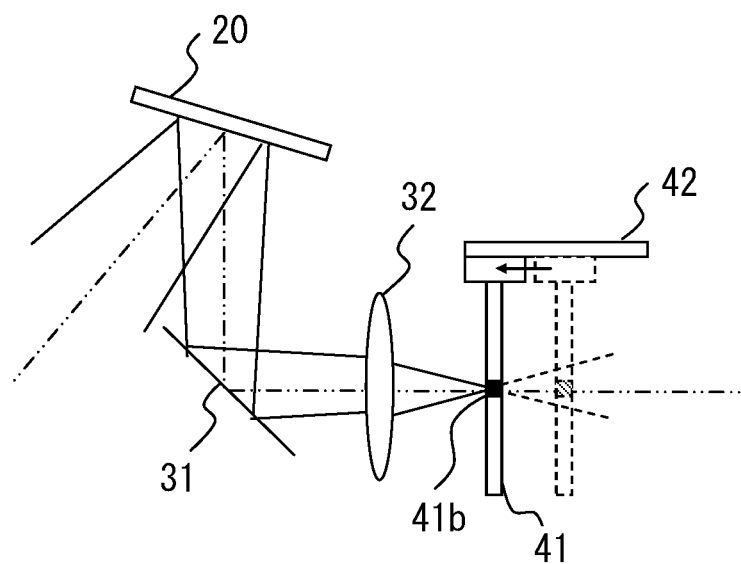
FIG. 4C is a third view explaining the method of blocking 0-order light by moving the 0-order light cut filter.
Figure 5:
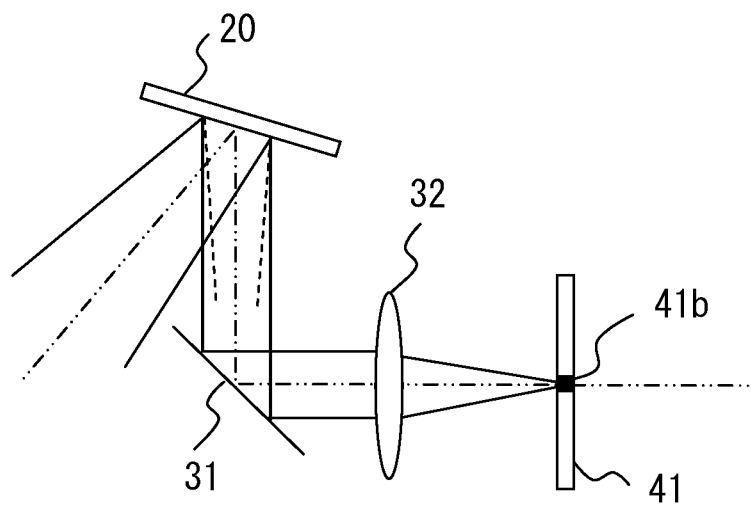
FIG. 5 is a view explaining a method of blocking 0-order light by changing the phase modulation pattern of an SLM.

By the control device 70 controlling the position adjustment mechanism 42 on the basis of the correspondence control information corresponding to the state of the light source unit 10, the focusing position and the blocking area 41b correspond to each other regardless of states of the light source unit 10 as shown in FIG. 4C. Thereby, 0-order light is blocked by the 0-order light cut filter 41 on the focusing plane so that only diffracted light is transmitted through the 0-order light cut filter 41. Thereby, an irradiation pattern based on the diffracted light is formed on sample plane SP.

As described above, in the pattern irradiation apparatus 100, the flux diameter of light emitted from the light source unit 10 can be changed by the control device 70 controlling the light source unit 10. Therefore, it is possible to adjust the light flux diameter so that it corresponds to the pupil diameter of the objective 50. This makes it possible to sufficiently derive the performance of the objective 50 (NA) while effectively utilizing light by reducing the amount of light that fails to be incident on the objective 50. Thereby, it is possible to illuminate a sample plane brightly.

Also, in the pattern irradiation apparatus 100, by the control device 70 making a correspondence between the focusing position of 0-order light and the position of the blocking area 41b, it is possible to form a desired irradiation pattern on sample plane SP while appropriately blocking 0-order light generated from the SLM 20 by using the blocking area 41b, which is compact. This makes it possible to minimize limitations on the area on sample plane SP that permits pattern formation. In particular, by the control device 70 making a correspondence between the focusing position of 0-order light and the position of the blocking area 41b on the basis of the correspondence control information that is in accordance with the state of the light source unit 10, a desired irradiation pattern can be formed on sample plane SP by appropriately blocking 0-order light even when the focusing position of 0-order light is changed by a change in the state of the light source unit 10.

Although an example has been described in which the flux diameter of light emitted from the light source unit 10 is changed by the control on the beam expander 12 performed by the control device 70, the control device 70 may change the state of the light source unit 10 by using other methods. The control device 70 may also control the light source unit 10 so that at least one of the wavelength, the wavefront, and the flux diameter of light emitted from the light source unit 10, which changes the focusing position of 0-order light, is changed.

Although an example has been described in which the control device 70 controls the position adjustment mechanism 42 so as to make a correspondence between the focusing position and the position of the blocking area 41b, the control device 70 may use other methods for making a correspondence between the focusing position and the position of the blocking area 41b. For example, the control device 70 may control a phase modulation pattern of the SLM 20 instead of the position adjustment mechanism 42 so as to make a correspondence between the focusing position of 0-order light generated by the SLM 20 and the position of the blocking area 41b.

In addition to phase modulation for forming a pattern (referred to as hologram modulation hereinafter), the SLM 20 can also perform phase modulation that changes the position of an irradiation pattern in the optical axis directions without changing the shape of the irradiation pattern (referred to as Fresnel modulation hereinafter). Fresnel modulation has effects not only on diffracted light but also on 0-order light, and permits control of the wavefront of light emitted from the SLM 20 so that light incident on the SLM 20 as convergent flux is converted into parallel flux to be emitted. Accordingly, by combining hologram modulation and Fresnel modulation, it is possible to form a desired irradiation pattern on sample plane SP while making a correspondence between the focusing position of 0-order light and the position of the blocking area 41b without moving the blocking area 41b.

Accordingly, it is also possible to employ a configuration in which the control device 70 does not control a phase modulation pattern of the SLM 20 so that it becomes a phase modulation pattern calculated from an irradiation pattern to be formed on sample plane SP (referred to as hologram pattern hereinafter), but controls a phase modulation pattern of the SLM 20 so that it becomes a phase modulation pattern that is a result of adding the hologram pattern and the phase modulation pattern for moving the focusing position of 0-order light generated by the SLM 20 to the position of the blocking area 41b (referred to as a Fresnel pattern hereinafter).

When the SLM 20 performs Fresnel modulation, the pattern irradiation apparatus 100 do not have to be provided with the position adjustment mechanism 42, making it possible to use a configuration of an existing pattern irradiation apparatus. Accordingly, the application to existing pattern irradiation apparatuses is easier than in a case of performing control by preparing the position adjustment mechanism 42. Note that selection between the method that controls the position adjustment mechanism 42 and the method that controls the SLM 20 may be made in accordance with whether the performance of blocking 0-order light should be emphasized or the apparatus configuration should be emphasized.

Next, explanations will be given for a method of preparing correspondence control information for each state of the light source unit 10.

First, mirror sample MS is arranged on sample plane SP, and the 0-order light cut filter 41 is taken out of the optical path by using the insertion-removal mechanism 43. Next, mirror sample MS is observed by using an image generated by the camera 62 and mirror sample MS is brought into focus. In this process, the SLM 20 does not perform modulation, but just functions as a mirror.

Thereafter, the insertion-removal mechanism 43 inserts the 0-order light cut filter 41 into the optical path. Then, the position of the position adjustment mechanism 42 that makes a correspondence between the focusing position of 0-order light and the position of the blocking area 41b (referred to as optimum position of the position adjustment mechanism 42 hereinafter) is searched for while the position adjustment mechanism 42 moves the 0-order light cut filter 41. The optimum position of the position adjustment mechanism 42 is detected as the position that causes the maximum difference in the light amount between before and after the insertion of the 0-order light cut filter 41 by comparing the light amounts detected before and after the 0-order light cut filter 41.

When the optimum position of the position adjustment mechanism 42 has been detected, information related to the optimum position of the position adjustment mechanism 42 and information related to the state of the light source unit 10 are stored as correspondence control information in the storage unit 71. Further, by executing this process for each state of the light source unit 10, it is possible to store correspondence control information in the storage unit 71 for each state of the light source unit 10. The process of determining the optimum position of the position adjustment mechanism 42 may be performed manually, for example before the product shipment of the pattern irradiation apparatus 100, or may be performed by the control device 70 in accordance with a dedicated program.

It is also possible to search for the optimum position of the position adjustment mechanism 42 while making the SLM 20 perform hologram modulation instead of making the SLM 20 function just as a mirror. In such a case, the optimum position of the position adjustment mechanism 42 can be determined by comparing changes in the light amounts at the center portion of the image in which 0-order light is detected. Also, it is possible to check whether or not the blocking area 41b blocks diffracted light in addition to 0-order light.

Almost the same processes are executed for preparing correspondence control information for a case where the control device 70 controls the SLM 20 so as to make a correspondence between the focusing position of 0-order light and the position of the blocking area 41b. However, that the SLM 20 adjusts Fresnel modulation instead of making the position adjustment mechanism 42 move the 0-order light cut filter 41 and that information related to Fresnel modulation by the SLM 20 is stored in the storage unit 71 instead of storing information related to the optimum position of the position adjustment mechanism 42 are different points.

Embodiment 2

Figure 6:
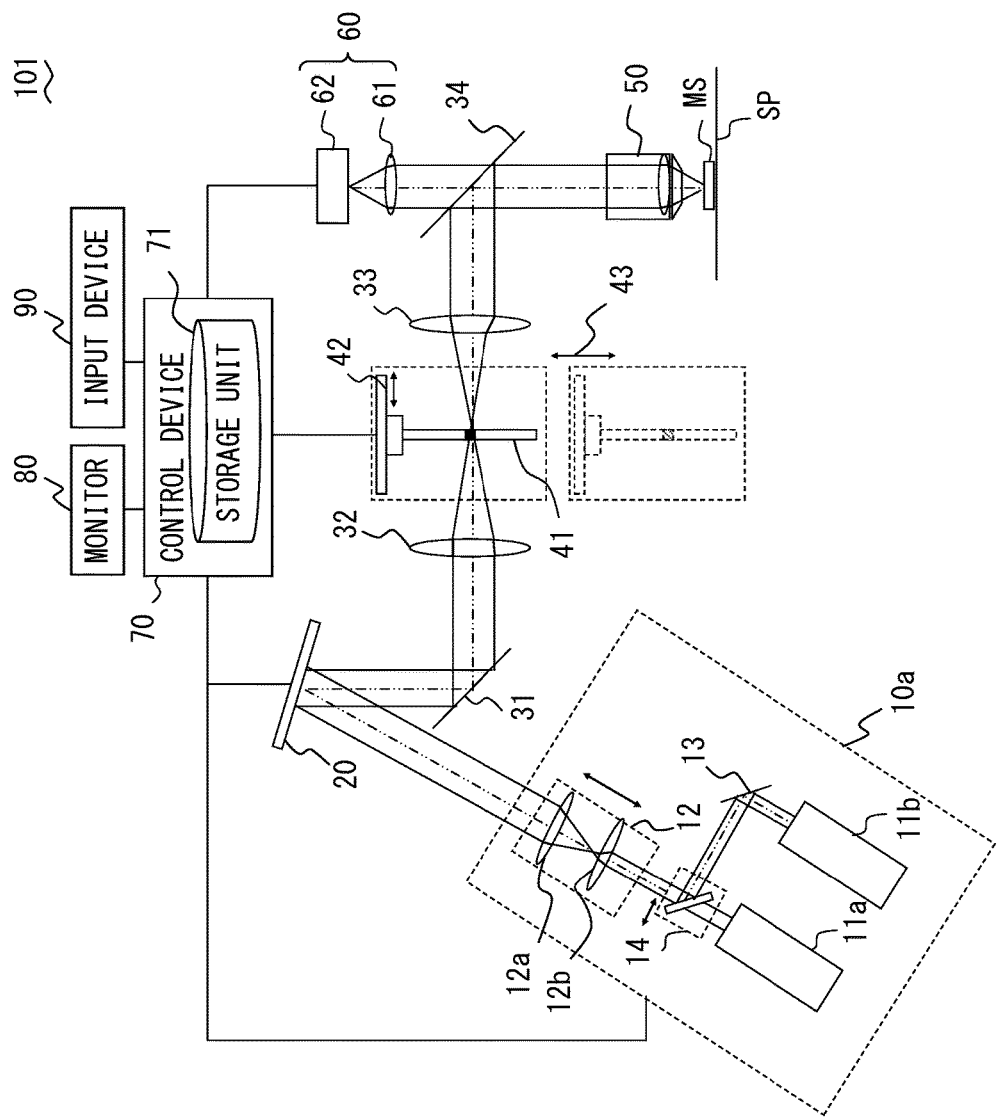
FIG. 6 shows an example of a configuration of a pattern irradiation apparatus according to embodiment 2.

FIG. 6 shows an example of a configuration of a pattern irradiation apparatus according to the present embodiment. A pattern irradiation apparatus 101 shown in FIG. 6 includes a light source unit 10a instead of the light source unit 10, which is different from the pattern irradiation apparatus 100 according to embodiment 1. The other aspects of the configuration of the pattern irradiation apparatus 101 are the same as those of the pattern irradiation apparatus 100.

The light source unit 10a includes a plurality of light sources that emit coherent light (light sources 11a and 11b), a beam expander 12 arranged in the optical path shared by the plurality of light sources, and a plurality of mirrors (mirrors 13 and 14).

An example of the light source 11a is an infrared pulse laser that emits ultrashort pulse laser light in the infrared region. An example of the light source 11b is a wavelength-variable laser. The beam expander 12 changes the distance between the lenses 12a and 12b and thereby changes the flux diameter of light emitted from the light source unit 10a.

The mirror 13 is fixed in the light source unit 10a whereas the mirror 14 is arranged in such a manner that it can move in the light source unit 10a. The mirror 14 functions as an optical path switching member for guiding, to the SLM 20, light that is from a selected one of the light sources 11a and 11b and that is emitted from the light source unit 10a.

In the pattern irradiation apparatus 101, the control device 70 controls the mirror 14 as an optical path switching member and the light sources 11b as a wavelength-variable laser in addition to the beam expander 12. Accordingly, changes in the wavefront of light emitted from the light source unit 10a, which are elements for moving the focusing position of 0-order light, are caused not only by changes in the light flux diameter but also by changes in the wavelength or by switching between light sources, which have individual variability. Accordingly, in the pattern irradiation apparatus 101, correspondence control information is stored beforehand in the storage unit 71 for each state of the light source unit 10a in which at least one of the wavelength, the wavefront, and the light flux diameter of light emitted from the light source unit 10a is different.

Also by using the pattern irradiation apparatus 101 having the above configuration, it is possible to form a desired irradiation pattern on sample plane SP while appropriately blocking 0-order light generated by the SLM 20 by using the blocking area 41b that is compact, similarly to the pattern irradiation apparatus 100 according to embodiment 1. Also, according to the pattern irradiation apparatus 101, switching is possible between the wavelengths of light used for the irradiation of sample plane SP or between light sources, making it possible to perform pattern irradiation by using light suitable for the sample.

Embodiment 3

Figure 7:
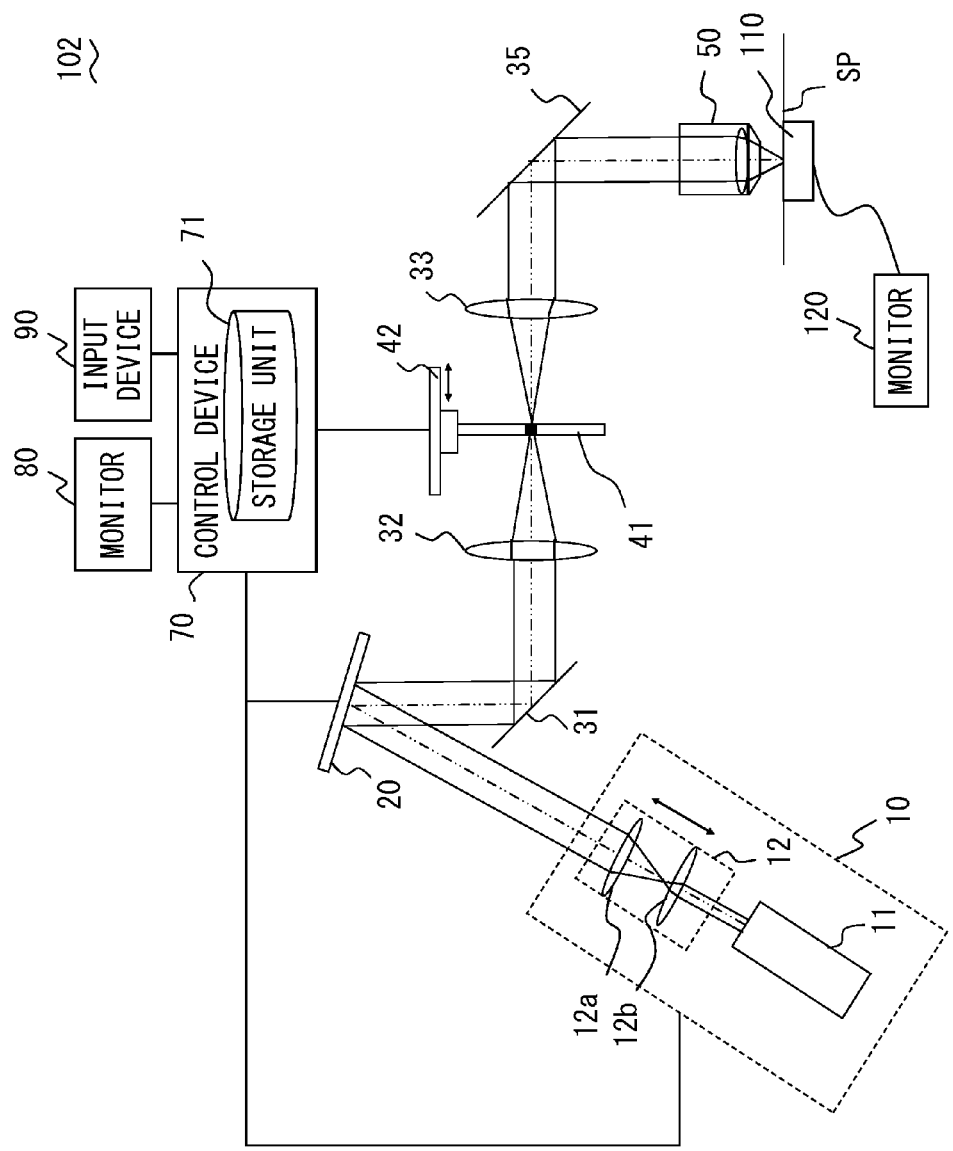
FIG. 7 shows an example of a configuration of a pattern irradiation apparatus according to embodiment 3.

FIG. 7 shows an example of a configuration of a pattern irradiation apparatus according to the present embodiment. A pattern irradiation apparatus 102 shown in FIG. 7 is a laser processing apparatus. The pattern irradiation apparatus 102 is different from the pattern irradiation apparatus 100 of embodiment 1 in that the pattern irradiation apparatus 102 does not include the insertion-removal mechanism 43 and includes a mirror 35 instead of the half mirror 34, and includes an optical power meter 110 and a monitor 120 instead of the observation system 60. The other aspects of the configuration of the pattern irradiation apparatus 102 are the same as those in the pattern irradiation apparatus 100.

Because the pattern irradiation apparatus 102 does not include the observation system 60, different processes from those of the pattern irradiation apparatus 100 are used for preparing correspondence control information for each state of the light source unit 10.

Specifically, the optical power meter 110 is first arranged on sample plane SP, the power of light emitted from the objective 50 onto sample plane SP is measured, and the result of the measurement is checked by the monitor 120. In this process, the SLM 20 does not perform modulation, but just functions as a mirror. Also, only Fresnel modulation is performed.

Thereafter, while the position adjustment mechanism 42 is moving the 0-order light cut filter 41 or the SLM 20 is adjusting Fresnel modulation, a correspondence is made between the focusing position of 0-order light and the position of the blocking area 41b. Whether or not a correspondence has been made between the focusing position of 0-order light and the position of the blocking area 41b is determined on the basis of whether or not the optical power measured by the optical power meter 110 has become sufficiently small.

Then, information related to the position adjustment mechanism 42 or related to Fresnel modulation of the SLM. 20 and information related to the state of the light source unit 10 at a time when a correspondence is made between the focusing position of 0-order light and the position of the blocking area 41b are stored in the storage unit 71 as correspondence control information. Further, by performing this process for each state of the light source unit 10, correspondence control information for each state of the light source unit 10 can be stored in the storage unit 71.

Also, by using the pattern irradiation apparatus 102 having the above configuration, it is possible to form a desired irradiation pattern on sample plane SP while appropriately blocking 0-order light generated by the SLM 20, by using a blocking area 41b that is compact, similarly to the pattern irradiation apparatus 100 according to embodiment 1. Also, according to the pattern irradiation apparatus 102, the apparatus configuration can be simplified compared with the pattern irradiation apparatus 100.

Also, the pattern irradiation apparatus 102 may employ a configuration in which the observation system 60 is added and the mirror 35 and the half mirror 34 can be exchanged. These configurations maybe selected appropriately for an adjustment and for pattern irradiation. Thereby, it is possible to easily perform a preadjustment while watching an image during the adjustment by employing a simple configuration for pattern irradiation.

The above described embodiments show specific examples for facilitating the understanding of the present invention, and the present invention is not limited to these examples. The pattern irradiation apparatus according to the present invention permits various alterations and modifications without departing from the spirit of the present invention defined in claims.

For example, the SLM 20 arranged at the pupil conjugate position with respect to the objective 50 has been explained by using an example of an LCOS of a reflection type; however, the SLM 20 is not limited to an SLM of a reflection type and may be an SLM of a transmission type.

Also, explanations have been given for the controlling of making a correspondence between the focusing position of 0-order light and the position of the blocking area 41b by using an example where the focusing position of 0-order light moves in the optical axis directions on the basis of the state of the light source unit; however, the focusing position of 0-order light may move in the directions orthogonal to the optical axis on the basis of the state of the light source unit. In such a case, the control device 70 can make a correspondence between the focusing position of 0-order light and the position of the blocking area 41b by moving the position adjustment mechanism 42 in the directions orthogonal to the optical axis or by making the SLM 20 perform phase modulation of moving the position of an irradiation pattern in the directions orthogonal to the optical axis without changing the shape of the irradiation pattern (referred to as tilt modulation hereinafter).

Also, the control of the position adjustment mechanism 42 and the control of the SLM 20 may be performed in parallel. For example, when the focusing position of 0-order light moves both in the optical axis directions and in the directions orthogonal to the optical axis in accordance with the state of the light source unit, it is possible to employ a configuration in which the control of the position adjustment mechanism 42 includes the adjustment in the optical axis directions, which is particularly effective in blocking 0-order light, and in which the control of the SLM 20 includes refinement in the directions orthogonal to the optical axis (tilt modulation). Control such as this can avoid a situation where the apparatus configuration becomes complicated due to an adjustment in the directions orthogonal to the optical axis, which is performed mainly for refinement.

What is claimed is:

1. A pattern irradiation apparatus comprising:
a light source unit;
an objective that irradiates a sample plane with light emitted from the light source unit;
a spatial light modulator of a phase modulation type that is arranged at a position optically conjugate with a pupil position of the objective and that modulates a phase of the light emitted from the light source unit;
a light blocking member that is arranged in an optical path between the spatial light modulator and the objective and that is configured to block 0-order light generated by the spatial light modulator; and
a control device that makes a correspondence between a focusing position of the 0-order light generated by the spatial light modulator and a position of the light blocking member so that the 0-order light generated by the spatial light modulator is blocked by the light blocking member and diffracted light generated by the spatial light modulator is transmitted through the light blocking member.

2. The pattern irradiation apparatus according to claim 1, wherein
the control device controls the light source unit so that at least one of a wavelength, a wavefront, and a flux diameter of the light emitted from the light source unit changes.

3. The pattern irradiation apparatus according to claim 1, further comprising
a position adjustment mechanism that moves a position of the light blocking member, wherein
the control device controls the position adjustment mechanism so that a correspondence is made between a focusing position of the 0-order light generated by the spatial light modulator and a position of the light blocking member.

4. The pattern irradiation apparatus according to claim 1, wherein
the light source unit includes a lens system for changing a flux diameter of the light emitted from the light source unit; and
the control device controls the lens system so that light having a flux diameter in accordance with a pupil diameter of the objective is emitted from the light source unit.

5. The pattern irradiation apparatus according to claim 1, wherein
the light source unit includes a wavelength-variable laser.

6. The pattern irradiation apparatus according to claim 1, wherein
the light source unit includes:
a plurality of light sources; and
an optical path switching member for guiding, to the spatial light modulator, light that is from a light source selected from among the plurality of light sources and that is emitted from the light source unit.

7. The pattern irradiation apparatus according to claim 1, comprising
an insertion-removal mechanism that inserts and removes the light blocking member with respect to an optical path between the spatial light modulator and the objective; and
an optical detector that detects light from the sample plane.

8. The pattern irradiation apparatus according to claim 1, wherein
the pattern irradiation apparatus is a microscope apparatus.

* * * * *